Aug. 5, 1958  B. J. GARNETT  2,846,092
DOLLY INCLUDING A WINCH MECHANISM
Filed Dec. 10, 1956  2 Sheets-Sheet 1

INVENTOR:
Bernarr J. Garnett
By Hubert E. Metcalf
His Patent Attorney

Aug. 5, 1958 B. J. GARNETT 2,846,092
DOLLY INCLUDING A WINCH MECHANISM
Filed Dec. 10, 1956 2 Sheets-Sheet 2
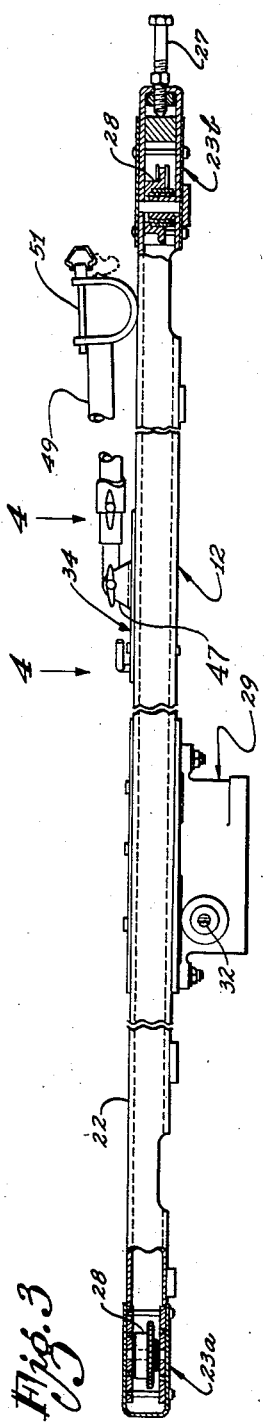
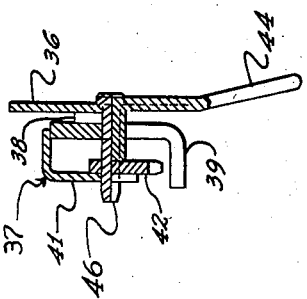
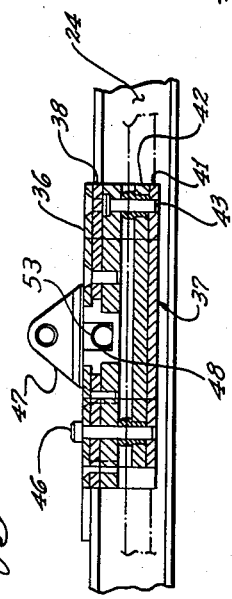
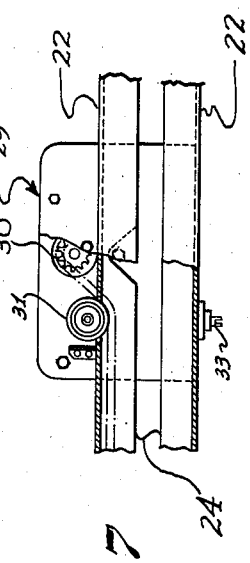
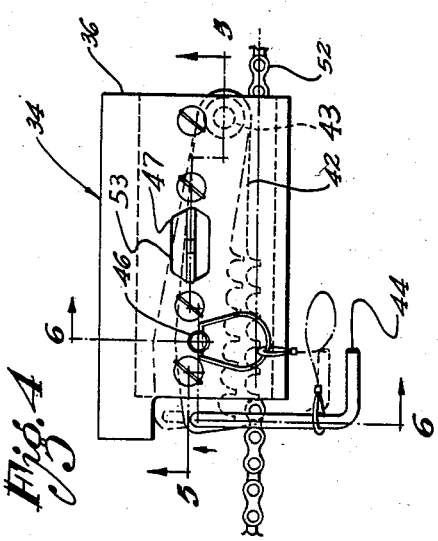
INVENTOR:
Bernarr J. Garnett
His Patent Attorney

United States Patent Office 2,846,092
Patented Aug. 5, 1958

2,846,092
DOLLY INCLUDING A WINCH MECHANISM

Bernarr J. Garnett, Pasadena, Calif., assignor, by mesne assignments, to Northrop Aircraft, Inc., Hawthorne, Calif., a corporation of California Application December 10, 1956, Serial No. 627,370

2 Claims. (Cl. 214—85)

This invention relates to material handling equipment and more particularly to elevating and transportation type dollies including a winch facility for moving components lengthwise along the supporting rails of the dolly.

Recently extensive emphasis has been placed on the design and construction of elevating and transportation type dollies rendering them self-sufficient. In other words, dollies of the above character have been developed on which components to be transported thereby may be positioned on the supporting rails of the dolly without the aid of extensive auxiliary hoisting equipment. Also dollies have been proposed embodying supporting rails defining unobstructed tracks adapted to receive roller adapters on which components are mounted. Thus when such dollies are aligned in end to end abutting relation components may be easily and quickly transferred from one dolly to another or from a loading platform to a dolly and vice versa.

However, notwithstanding the current advances that have been made in dolly design, the correct positioning and the moving of components along the rails of a dolly, also the transfer of components from one dolly to another, remains quite difficult and troublesome under certain conditions. This is particularly true in connection with an elevating dolly at such time as it becomes necessary to move components up the inclined supporting rails thereof or in cases where extremely heavy components are to be moved from one trailer to another.

Accordingly it is an object of the present invention to provide a dolly or transportation trailer including a winch facility for moving heavy components up or down the inclined rails of the dolly safely and easily.

Another object is to provide a dolly or transportation trailer including a winch facility for safely and easily moving components from one dolly to another when the latter are arranged in end to end abutting relation.

Another object is to provide a dolly or transportation trailer including power amplification means for moving components along the supporting rails of the dolly and in which the power amplification means includes novel quick disconnect means.

Another object is to provide a dolly or transportation trailer including power amplification means and in which the latter is simple in design and yet rugged in construction, economical to manufacture, and which is especially free of mal-function tendencies.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 3 is a side elevational view of the winch mechanism portions of which are broken away to better show the construction thereof.

Figure 4 is a plan view of the slide block of the winch mechanism as indicated by the arrows 4—4 in Figure 3.

Figures 5 and 6 are sectional views of the slide block as seen along the lines 5—5 and 6—6 of Figure 4.

Figure 7 is a plan view of the drive assembly with portions thereof broken away to clarify its construction.

Figure 1:
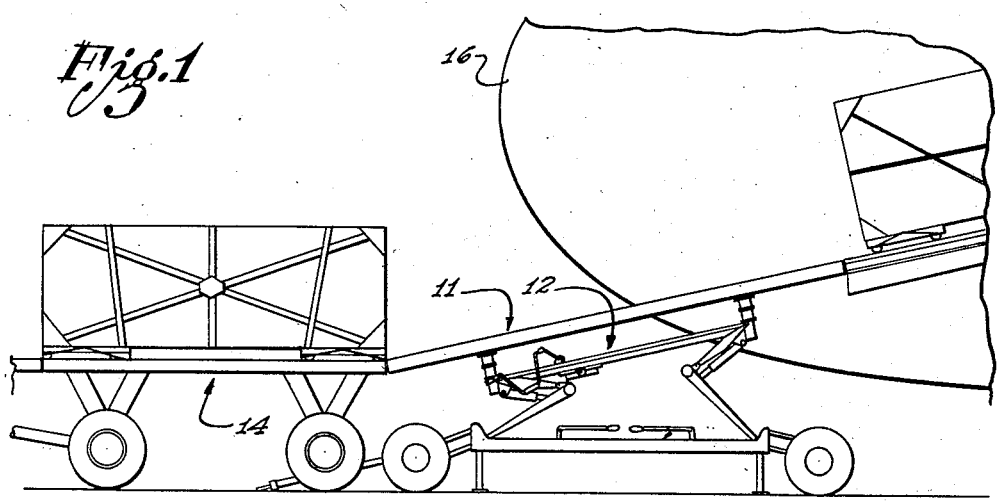
Figure 1 is a side elevational view showing a cargo loading operation in which an elevating type dolly is utilized and which embodies the winch mechanism as disclosed herein.

Referring now to the drawings, Figure 1 illustrates a typical cargo loading operation in which an elevating type dolly equipped with the winch mechanism as disclosed herein is utilized to advantage. This figure is for purpose of illustration only. The winch mechanism embodied in the subject elevating dolly may be used to advantage in many other and different instances.

In Figure 1 an elevating type dolly 11, equipped with a winch mechanism 12, is utilized in transferring cargo from a transportation trailer 14 to a cargo plane 16. The transportation trailer 14 and elevating dolly 11 are of the type shown and disclosed in copending applications Serial Number 527,099, filed August 8, 1955, and Serial Number 544,850, filed November 4, 1955, respectively. It will be understood that supporting rails of the dolly 11, trailer 14, and the incline rails of the cargo plane 16 are aligned at such time as the trailer, dolly, and plane are arranged in end to end abutting relation as shown in Figure 1. Thus a continuous track is provided from the trailer 14 to the plane 16 over which cargo may be moved.

Figure 2:
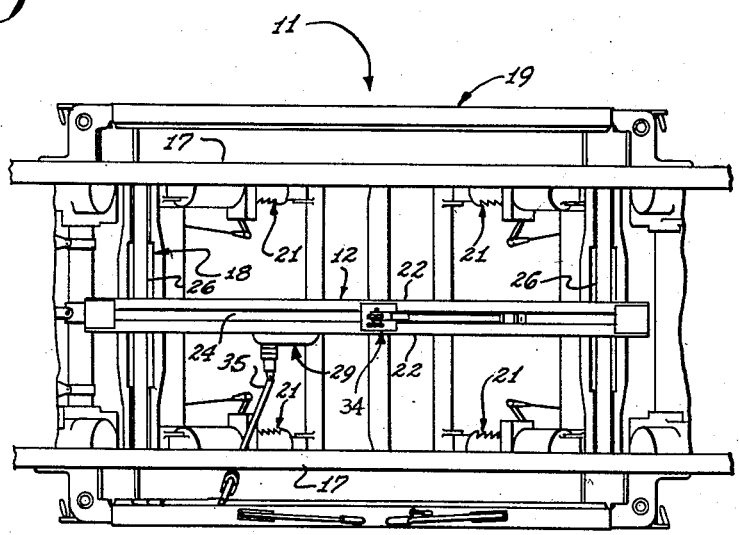
Figure 2 is a partial plan view of the elevating dolly of Figure 1 and which shows the location of the winch mechanism with respect to the supporting rails of the dolly.

Briefly the elevating dolly 11 includes a pair of rails 17 extending in spaced parallel relation with respect to each other and which are mounted on a cradle assembly 18 which in turn is mounted on mobile substructure 19 as best seen in Figure 2. The cradle assembly 18 and rails 17 may be inclined longitudinally, with respect to the horizontal, by means of actuating assemblies 21, one of these assemblies being located adjacent each corner of the sub-structure 19. Extending lengthwise of the cradle 18 and in parallel relation with respect to the rails 17 is the winch mechanism 12.

The winch mechanism 12 consists of a pair of channel shaped members 22 as best seen in Figures 2 and 3. These channel members are secured together in spaced relation, with their flange portions in spaced abutting relation, by means of bearing assemblies 23a and 23b located respectively at the opposite ends of the members 22. So positioned the channel members 22 define an elongated passageway 24 extending substantially throughout the length of the members 22. In this respect it will be noted that the channel members are slightly less in length than the supporting rails 17, in any event, however, they are long enough to span the cross-members 26 of the cradle assembly 18.

The sprocket bearing assemblies 23a and 23b are of similar and conventional construction. The assembly 23b, however, includes screw means 27 by means of which the assembly 23b may be moved lengthwise of the channel members 22 for a purpose which will be apparent presently. Sprockets 28, each having their teeth located in the same common plane, are respectively rotatably mounted in the bearing assemblies 23a and 23b.

Located below at any convenient position lengthwise of the channel members 22 and secured thereto is a drive assembly 29. This assembly consists in part of conventional reduction gearing the output member of which carries a sprocket 30 which is similar to the sprockets 28.

Also mounted in the assembly 29 for free rotational movement and on each side of the sprocket 30 are idler sprockets 31 only one of which is shown in Figure 7.

The drive assembly 29 is actuated by hand operated crank means 35, as best seen in Figure 2. The crank means is rotatably mounted on the cradle assembly 18 for movement therewith and is releasably attached to the input member 32 of the drive assembly 29.

Slidably mounted for movement throughout substantially the entire length of the aforementioned passageway 24 is a guide block assembly 34 which incorporates an easily operable locking feature. The assembly 34 includes an upper plate 36, adapted to span the uppermost open portion of the passageway 24 and provides bearing surfaces for the assembly 34 on the uppermost flanges of the members 22, and a body portion 37 located in its entirety within the passageway 24. The body portion includes a spacing plate 38, which contacts the abutting edges of the uppermost flanges of the members 22 in sliding relation, a guide plate 39, and a body plate 41. The guide and body plates are L-shaped in cross-section and are welded together to provide a box like structure of rectangular configuration in cross-section as best seen in Figure 6. The cross-sectional dimensions of the body portion of the assembly 34 is somewhat less than the cross-sectional dimensions of the passageway 24 and therefore moves freely therein as guided by the spacing plate 38.

A plate-like comb member 42 is mounted for pivotal movement between the plates 39 and 44 on a pin 43 extending between the latter plates. A portion of the forward edge of the comb member 42 which is spaced from the pin 43 is provided with a plurality of spaced teeth adapted to enter the spaces between contiguous rollers of a roller chain. The comb member is movable between an engaged and a disengaged position by means of a handle 44 which is pivotally attached to a portion of the comb member extending beyond one end of the body portion 37. The comb member 42 is releasably maintained in its engaged position, as shown by solid and dotted line construction in Figure 4, by means of a pin 46 which passes through aligned apertures in the plates 36, 38, 39 and 41. The pin 46 may also be utilized to secure the comb member in its disengaged position as shown by phantom construction in Figure 4.

A clevis member 47 is also mounted for pivotal movement about a vertical axis in the plates 36, 38 and 39 by means of a stem 48. One end of a push-pull rod 49 is pivotally attached to the clevis member 47 for pivotal movement about a horizontal axis. The other end of the rod 49 carries a clevis 51 adapted to be releasably attached to components or cargo which is to be moved along the rails 17 of the dolly 11.

Threaded over the sprockets 28, idler sprockets 31, and the driving sprocket 30 is an endless roller chain 52. Tension in the chain 52 may be effectively controlled by advancing or retracting the screw means 27 as required. The forward portion of the chain 52 is not deflected in any respect and, therefore, extends in a straight line between the sprockets 28—28. In so doing the roller chain passes through the hollow portion of the body portion of the assembly 34. The roller chain's location, as it passes through the body portion of the assembly 34, is further characterized in that it is adjacent the vertical portion of the guide plate 39 and aligned so that the spaced teeth of the comb member 42 enter the spaces between the chain's rollers at such time as the comb member is in its aforementioned engaged position.

From the foregoing description it will now be apparent that at such time as the drive assembly 29 is actuated by the crank means 35 the roller chain 52 will be caused to move lengthwise of the channel members 22. With the comb member 42 in its engaged position it will also be apparent that the guide and locking assembly 34 will move with the chain 52. Likewise any components mounted on the rails 17, to which the push-pull rod 49 is attached, will also be moved along the rails 17 of the dolly. It is to be understood that components or cargo positioned on the rails 17 are mounted on roller adapters (not shown) which permit easy movement thereof along the rails 17.

Frequently it becomes necessary to reposition the assembly 34 and rod 49 at different positions along the channel members 22. If this change is slight it may be accomplished by the crank means 35. However, if the change is considerable it is accomplished by disengaging the comb member 42 from the chain 52. This is accomplished by removing the pin 46 from the comb member 42. The comb member 42 may now be moved to its disengaged position by means of the handle 44. With the comb member in its disengaged position the assembly 34 may be freely moved lengthwise of the members 22 as desired or required. It will also be obvious that the comb member 42 may be reengaged with the chain 52 at its new location and again moves with the roller chain.

It will also be noted that the push-pull rod 49 and clevis member 47 may be quickly released and removed from the guide block assembly 34 if desired. This is accomplished by pivotally turning the rod 49 and clevis 47 to a position in which the push-pull rod is normal to the lengthwise extent of the channel members 22. A pin 53 which passes through the stem 48 normally functions to retain the clevis in its operating position in the assembly 34. The pin 53 may now be removed through an oblong aperture 53 formed in the plate 36. The rod 49 and clevis 47 may now be completely removed from the dolly 11 and additional space is thereby made available for components mounted on the rails 17 if such space is required.

While in order to comply with the statute, the invention has been described in language more or less specific as to structural features it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. The combination with a dolly having a frame structure which embodies a cradle structure including a pair of spaced parallel rails on which components to be transported by said dolly may be mounted for longitudinal movements of a winch mechanism mounted on said cradle structure, said winch mechanism includes a pair of elongated channel shaped members secured together with their flanges in spaced abutting relation to define a longitudinal passageway therebetween, said channel members extend in parallel relation with respect to said rails and throughout the major length thereof, a pair of sprockets rotatably mounted in said passageway and located respectively adjacent each end of said channel members, an endless roller chain mounted on said sprockets, operating means for driving said chain, attach means which includes a box-like structure mounted in said passageway for longitudinal movement therein in response to movements of said chain, a push-pull rod one end of which is attached to said box-like structure and the other end thereof defines means adapted to be releasably attached to said components at such times as the latter are supported on said rails, and a comb member pivotally mounted in said box-like structure and which includes a plurality of spaced teeth facing said chain, said comb member being movable between an engaged position in which said teeth are positioned in sequential openings located between the rollers of said chain whereby movements of said chain are imparted to said box-like structure and a disengaged position in which said teeth are spaced from said chain and allow the latter to move without imparting corresponding movement to said box-like structure.

2. In a dolly having a pair of spaced component supporting rails, a winch mechanism comprising, a pair of elongated channel members secured together in parallel relation with their flanges positioned in spaced abutting relation to define a passageway therebetween, a pair of sprockets rotatably mounted in said passageway and located respectively adjacent each end of said channel members, an endless roller chain mounted on said sprockets, operating means mounted on said channel members for driving said chain on said sprockets, attach means which includes a box-like structure mounted in said passageway for longitudinal movement therein in response to movements of said chain, a push-pull rod one end of which is attached to said box-like structure and the other end thereof defines means adapted to be releasably attached to components which may be supported on said rails, and a comb member pivotally mounted in said box-like structure and which includes a plurality of spaced teeth facing said chain, said comb member being movable between an engaged position in which said teeth are positioned in sequential openings located between the rollers of said chain whereby movements of said chain are imparted to said box-like structure and a disengaged position in which said teeth are spaced from said chain and allow the latter to move without imparting corresponding movement to said box-like structure.

References Cited in the file of this patent

UNITED STATES PATENTS

| 1,433,884 | Frost | Oct. 31, 1922 |
| 1,821,327 | Scott | Sept. 1, 1931 |
| 2,107,465 | Borggaard | Feb. 8, 1938 |
| 2,123,505 | Faries | July 12, 1938 |

FOREIGN PATENTS

| 849,376 | Great Britain | Sept. 15, 1952 |